US008508488B2

(12) United States Patent
Woo et al.

(10) Patent No.: US 8,508,488 B2
(45) Date of Patent: Aug. 13, 2013

(54) DISPLAY APPARATUS HAVING TOUCH SCREEN FUNCTION

(75) Inventors: Seok-Gyun Woo, Suwon-si (KR); Hak-Cheol Yang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1041 days.

(21) Appl. No.: 12/330,373

(22) Filed: Dec. 8, 2008

(65) Prior Publication Data

US 2009/0309844 A1 Dec. 17, 2009

Related U.S. Application Data

(60) Provisional application No. 61/061,067, filed on Jun. 12, 2008.

(51) Int. Cl.
*G06F 3/041* (2006.01)

(52) U.S. Cl.
USPC .......................................... 345/173; 345/60

(58) Field of Classification Search
USPC .............................. 345/173, 175, 177, 60–72
See application file for complete search history.

(56) References Cited

U.S. PATENT DOCUMENTS

| | | | | |
|---|---|---|---|---|
| 5,764,223 | A * | 6/1998 | Chang et al. | 345/175 |
| 6,828,959 | B2 * | 12/2004 | Takekawa et al. | 345/173 |
| 6,947,032 | B2 * | 9/2005 | Morrison et al. | 345/173 |
| 6,972,401 | B2 * | 12/2005 | Akitt et al. | 250/221 |
| 7,456,824 | B2 * | 11/2008 | Yoshimura | 345/173 |
| 7,538,759 | B2 * | 5/2009 | Newton | 345/173 |
| 8,149,221 | B2 * | 4/2012 | Newton | 345/173 |
| 8,310,411 | B2 * | 11/2012 | Yim | 345/60 |
| 2004/0178729 | A1 | 9/2004 | Kim et al. | |
| 2004/0201351 | A1 * | 10/2004 | Woo et al. | 313/582 |
| 2006/0091802 | A1 * | 5/2006 | Hong et al. | 313/582 |
| 2006/0209047 | A1 * | 9/2006 | Jeong | 345/173 |
| 2009/0066671 | A1 | 3/2009 | Kweon et al. | |

FOREIGN PATENT DOCUMENTS

| | | |
|---|---|---|
| JP | 2000-200148 | 7/2000 |
| KR | 10-0804815 | 2/2008 |
| KR | 100804815 B1 | 2/2008 |
| WO | WO 2005/109396 A2 | 11/2005 |

OTHER PUBLICATIONS

Korean Patent Abstracts, Publication 100804815 B1, Published Feb. 12, 2008, for Kweon, et al.
Patent Abstracts of Japan, Publication No. 2000-200148, dated Jul. 18, 2000, in the name of Yoshio Koizumi et al.
Korean Patent Abstracts, Publication No. 100804815 B1, dated Feb. 12, 2008, in the name of Chul Kweon et al.
English machine translation of Japanese Publication 2000-200148, dated Jul. 18, 2000, previously filed in an IDS dated Mar. 11, 2009, 44 pages.
SIPO Office action dated Nov. 2, 2012, for corresponding Chinese Patent application 200910140677.4, (12 pages).

* cited by examiner

*Primary Examiner* — Jason Mandeville
(74) *Attorney, Agent, or Firm* — Christie, Parker & Hale, LLP

(57) ABSTRACT

A display device includes: a display panel including a first region having a plurality of display cells for displaying an image, and a second region at least partly surrounding the first region, the second region including a plurality of light generation cells for generating light, different from the image, to be detected for touch position sensing; and a pair of cameras located at or near a periphery of the display panel, aligned with respective crossing directions across the display panel, and oriented to detect the light generated by the light generation cells.

32 Claims, 19 Drawing Sheets

DISPLAY APPARATUS HAVING TOUCH SCREEN FUNCTION

CROSS-REFERENCE TO RELATED APPLICATION

This application claims priority to and the benefit of U.S. Provisional Patent Application No. 61/061,067 filed Jun. 12, 2008, the entire content of which is incorporated herein by reference.

BACKGROUND OF THE INVENTION

1. Field of the Invention

The present invention relates to a display apparatus having a function of a touch screen, and more particularly, to a display apparatus which performs a function of a touch screen by detecting light generated by a light emission mechanism.

2. Description of the Related Art

Touch screen displays are increasingly used in a number of different applications ranging from personal mobile devices to larger display devices used for giving presentations to an audience.

One type of touch screen display uses a plurality of photodiodes and a plurality of light emitting diodes (LEDs). The photodiodes and the sensors are arranged on opposite sides of the display screen, such that each photodiode detects light generated by the corresponding LED. When a particular location on the display screen is touched, it blocks the light from the LED from reaching the corresponding photodiode, such that the touched position can be identified. This type of touch sensing scheme may be used in flat panel displays, such as a liquid crystal display (LCD) and a plasma display device, as well as a cathode ray tube (CRT) display.

In such touch screen displays, as the resolution increases, the number of photodiodes and LEDs must also increase. The increased number of photodiodes and LEDs typically leads to increased heat generation, increased cost and increased power consumption. Therefore, it is desirable to provide a display having a touch screen function that does not require as much increase to heat generation, cost or power consumption as the resolution increases.

SUMMARY OF THE INVENTION

The present invention provides a display apparatus having a touch screen function. Such touch screen display may be manufactured at low costs because costs related to installing a separate light source are not incurred by implementing a touch screen function by using infrared light which is obtained according to a light emission mechanism.

In an exemplary embodiment according to the present invention, a display device including a display panel is provided. The display panel includes: a first region including a plurality of display cells for displaying an image; and a second region at least partly surrounding the first region, the second region including a plurality of light generation cells for generating light, different from the image, to be detected for touch position sensing; and a pair of cameras located at or near a periphery of the display panel, aligned with respective crossing directions across the display panel, and oriented to detect the light generated by the light generation cells.

The pair of cameras may be located at respective corners of the display panel. The light generated by the light generation cells may be infrared light. Each of the display cells may include a phosphor therein, and none of the light generation cells may have a phosphor therein.

The cameras may be oriented at a downward angle with respect to a display surface of the display panel suitable for detecting the light generated by the light generation cells. The cameras may be oriented to focus in a direction parallel to a display surface of the display panel.

The display panel may further include a plurality of dummy cells located along an outer periphery of the second region. Each of the dummy cells may include only one of a scan electrode or a common electrode. The dummy cells may not include address electrodes.

The display panel may further include a plurality of dummy cells between the first region and the second region. The dummy cells may not include address electrodes.

At least one of the light generation cells may have a width that is wider than that of the display cells. The display panel may further include a plurality of common electrodes, a plurality of scan electrodes and a plurality of address electrodes crossing the common electrodes and the scan electrodes, an address electrode among the address electrodes corresponding to the at least one of the light generation cells having a width that is wider than that of the address electrodes corresponding to the display cells.

The display device may further include another camera located at or near the periphery of the display panel, aligned with a crossing direction across the display panel that is different from the crossing directions of the pair of cameras, and oriented to detect the light generated by the light generation cells.

The display device may further include a second pair of cameras located at or near the periphery of the display panel, aligned with different crossing directions across the display panel from the crossing directions of the pair of cameras, and oriented to detect the light generated by the light generation cells. The crossing directions may be diagonal directions of the display panel.

The display device may further include at least one mirror for directing the light generated by the light generation cells toward the pair of cameras. The at least one mirror may include a transmissive/reflective mirror configured to reflect the infrared light while passing through visible light.

The at least one mirror may include a material selected from the group consisting of oxidized titanium, oxidized silicon, and combinations thereof. The at least one mirror may include polished stainless steel.

The at least one mirror may be mounted on a base located at a periphery of the display panel.

The at least one mirror may have a sloped face for directing the generated light toward the pair of cameras. The display device may further include at least one convex prism, the convex prism adjacent to the sloped face, so as to converge the generated light to the cameras.

The at least one mirror may have a concave face for converging the generated light toward the cameras. The at least one mirror may be located along the periphery of the display panel.

The display device may further include an infrared light blocking filter on the first region. The display device may further include an infrared transmission filter in front of at least one of the cameras.

In another exemplary embodiment according to the present invention, a method of sensing a touch position of an object on a display device is provided. The display device includes a display panel, a first camera and a second camera, the display panel including a first region having a plurality of display cells for displaying an image, a second region at least partly surrounding the first region and including a plurality of light generation cells for generating light, different from the image, to be detected for touch position sensing. The method includes: detecting the generated light with the first camera aligned with a first direction across the display panel; detecting the generated light with the second camera aligned with a second direction across the display panel, the second direction crossing the first direction; and determining the touch position of the object by comparing detection signals of the first and second cameras.

In another exemplary embodiment according to the present invention, a plasma display device including a display panel is provided. The display panel includes: a first substrate; a second substrate spaced from and facing the first substrate; and a plurality of barrier ribs between the first and second substrates, the barrier ribs defining a plurality of display cells on a display region for displaying an image and a plurality of light generation cells on a non-display region for generating light that is different from the image; and a pair of cameras located at or near a periphery of the display panel, aligned with respective diagonal directions of the display panel, and oriented to detect the light generated by the light generation cells.

The plasma display device may further include: a front case and a rear case containing the display panel, wherein the front case has a portion covering the non-display region.

The pair of cameras may be located at respective corners of the display panel. The display device may further include an infrared light blocking filter on the display region. The light generated by the light generation cells may be infrared light. The display device may further include an infrared transmission filter located in front of at least one of the cameras.

BRIEF DESCRIPTION OF THE DRAWINGS

The above and other features of the present invention will become more apparent by describing in detail exemplary embodiments thereof with reference to the attached drawings in which.

DETAILED DESCRIPTION

Figure 1:
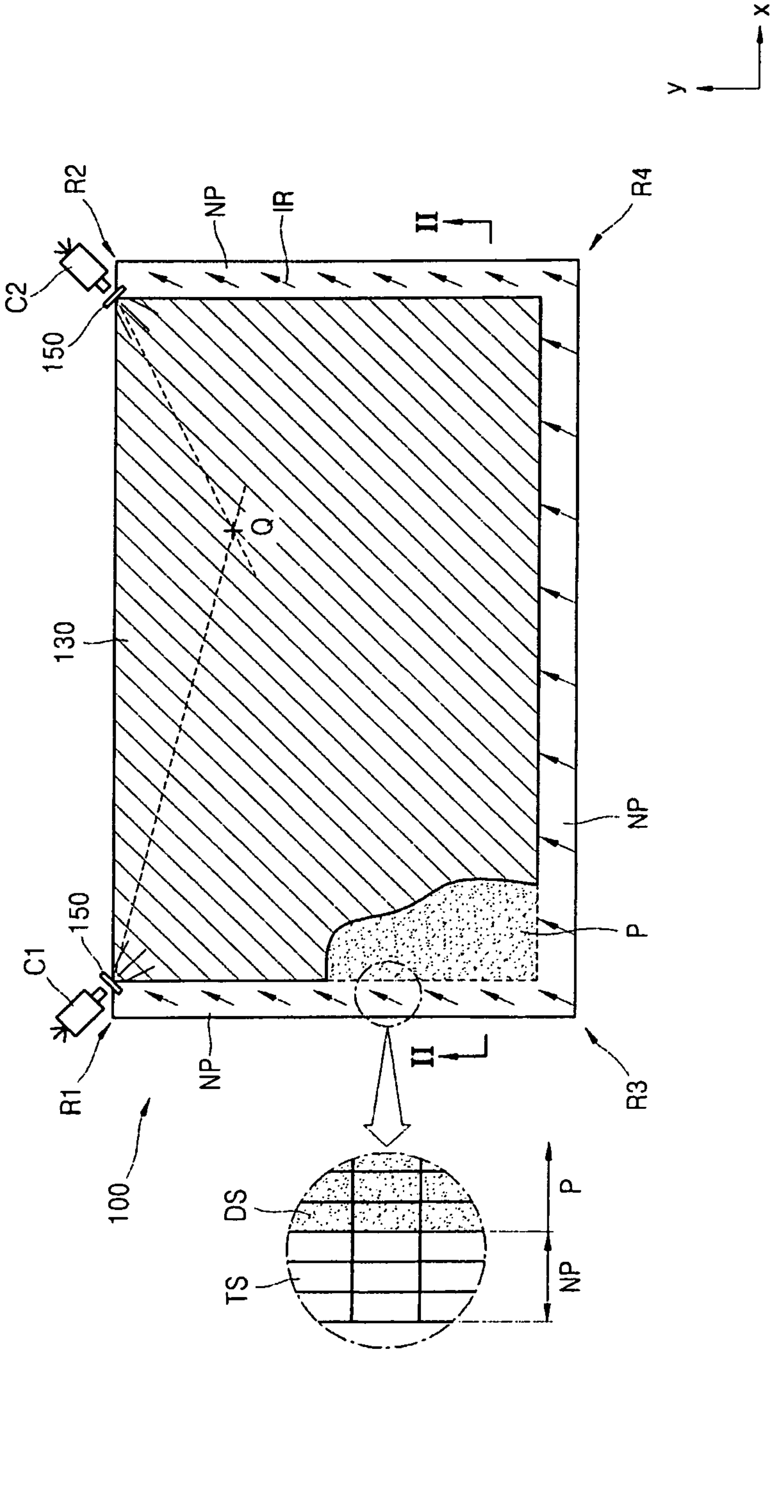
FIG. 1 illustrates partially cut-away plan view of a display apparatus according to an embodiment of the present invention.

The present invention will now be described more fully with reference to the accompanying drawings, in which exemplary embodiments of the invention are shown. Like reference numerals in the drawings denote like elements.

FIG. 1 illustrates a partially cut-away plan view of a display apparatus according to an embodiment of the present invention. Referring to FIG. 1, the display apparatus includes a display panel 100 for displaying an image, and first and second detection cameras C1 and C2 for detecting a touched location (or touch location) Q on the display panel 100 according to an optical method. In one embodiment, the angle of view (or field of view) of the cameras C1 and C2 is 90 degrees, however, the present invention is not limited thereto. By way of example, the angle of view of the cameras may be approximately 90 degrees or larger than 90 degrees (e.g., approximately 135 degrees or approximately 180 degrees) in other embodiments.

A substantially rectangular display area P for displaying an image is located at the center of the display panel 100, and a plurality of display cells DSs are located in the display area P. Infrared radiation cells TSs are arranged in x and y directions within a non-display area NP which is formed along vertical and horizontal edge portions (i.e., along the outer periphery) of the display panel 100. In other words, the infrared radiation cells TSs are located in the non-display area NP, which is located along the periphery of the display area P. The infrared radiation cells TSs may also be referred to as light generation cells.

Hence, the infrared radiation cells TSs are arranged in a shape of a band so as to partially or completely surround the display area P. For example, the infrared radiation cells TSs may be arranged along right and left edge portions and a bottom edge portion of the display panel 100. As can be seen in the enlarged view inside a circle of a portion of the display panel 100, there are 3 infrared radiation cells TSs in each row, however, the present invention is not limited thereto. By way of example, the number of infrared radiation cells TSs may be selected from 3 to 15 in various different embodiments.

In the embodiment illustrated in FIG. 1, the infrared radiation cells TSs are not located along an upper edge portion of the display panel 100. In this embodiment, the first and second detection cameras C1 and C2 are installed near the upper edge portion of the display panel 100. The cameras C1 and C2 may be located at other suitable locations in other embodiments.

Each of the display cells DSs, which is a minimum light-emission unit for displaying an image, displays a designated color in response to plasma discharges. Adjacent display cells DSs that display different colors (e.g., red (R), green (G) and blue (B) colors) constitute a pixel, which corresponds to a dot on a screen of the display apparatus. The display cells DSs include electrodes, each pair of which generates discharges, and are turned on a predetermined number of times in response to a controlled signal, thereby accomplishing gradation of an image.

In the display apparatus illustrated in FIG. 1, the infrared radiation cells TSs do not display images. Instead, the infrared radiation cells TSs generate infrared light IR in response to plasma discharges, thereby serving as an optical source used to optically detect the touched location Q on the display area P. The infrared radiation cells TSs may generate identical numbers of discharges and may be turned on simultaneously. The infrared radiation cells TSs may be turned on a minimum acceptable number of times or more so as to provide a sufficient amount of light for the detection of the touched location Q on the display area P.

The first and second detection cameras C1 and C2 receive light (e.g., infrared light) generated by the infrared radiation cells TSs. This way, when the light generated by the infrared radiation cells TSs are blocked by an object, such as a finger, the cameras C1 and C2 detect such blockage of light as light blocking signals (or blocked light signals).

As illustrated in FIG. 1, the first and second detection cameras C1 and C2 may be arranged at or near first and second corners R1 and R2, respectively, which are upper left and upper right corners of the display panel 100. In other embodiments, the first and second detection cameras C1 and C2 may be located at or near different corners, or located at or near any suitable position along the periphery of the display panel 100 for detection of the touched location. Also, different number of cameras may be used in different embodiments.

The first detection camera C1, which is located at or near the upper left corner (or a first corner) R1 of the display panel 100, may be tilted a predetermined angle in a diagonal direction so as to face a fourth corner R4. The second detection camera C2, which is located at or near the upper right corner (or a second corner) R2 of the display panel 100, may be tilted a predetermined angle in a diagonal direction so as to face a third corner R3.

The first and second detection cameras C1 and C2 may be line cameras in which optoelectronic devices, such as charge coupled device (CCD) or complementary metal oxide semiconductor (CMOS) image sensors, are arranged in a row, or area cameras in which optoelectronic devices are arranged two-dimensionally. Infrared transmission filters 150 for passing light only at an infrared band may be arranged in front of the first and second detection cameras C1 and C2. The infrared transmission filters 150 filter out noise components so as to pass light only at infrared bands, and transmit the infrared light to the first and second detection cameras C1 and C2.

Figure 2:
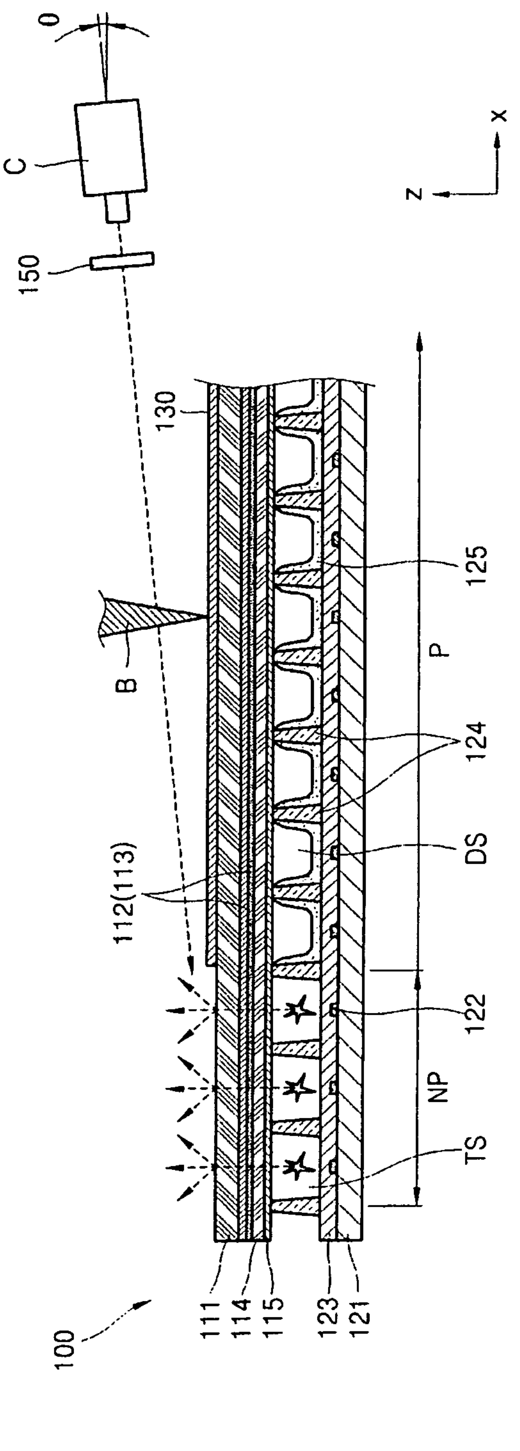
FIG. 2 is a cross-sectional view taken along the line II-II of FIG. 1.

FIG. 2 is a cross-sectional view taken along the line II-II of FIG. 1. Referring to FIG. 2, barrier ribs 124 are interposed between a front substrate 111 and a rear substrate 121 that face each other, thereby defining the display cells DSs on the display area P and defining the infrared radiation cells TSs on the non-display area NP.

In a touch screen structure including the infrared radiation cells TSs as a light source and a detection camera C as a light receiving unit, the infrared radiation cells TSs emit the infrared light IR, and the detection camera C is tilted a predetermined angle θ toward the surface of the display panel 100 so as to focus on (or face) the non-display area NP in a diagonal direction. The tilt angle θ in one embodiment may be selected such that the camera C is able to capture the infrared light IR generated by the infrared radiation cells TSs while substantially avoiding detecting light generated by the display cells DS. The tilt angle θ may vary depending on such factors of the size of the display panel and the number of the infrared radiation cells TSs in each row.

When an external object B such as a finger or a pen contacts an arbitrary location on the display area P, a path through which the detection camera C receives light is interrupted (or blocked) while receiving IR radiation generated in the non-display area NP, and concurrently a portion whose light intensity rapidly decreases in a captured image is detected. By way of example, an accurate touched location can be determined by detecting portions having rapidly-dropping light intensity from captured images obtained by the first and second detection cameras C1 and C2.

Since the display cells DSs on the display area P also emit the infrared light IR due to the plasma discharge, an infrared blocking filter 130 is installed in front of the display area P in order to prevent the detection camera C from capturing the infrared light IR generated by the display cells DSs. However, as long as an angle at which the detection camera C is oriented to face the non-display area NP is precisely adjusted so as not to receive light from inside of the display area P, the infrared blocking filter 130 may not be needed or installed.

Figure 3:
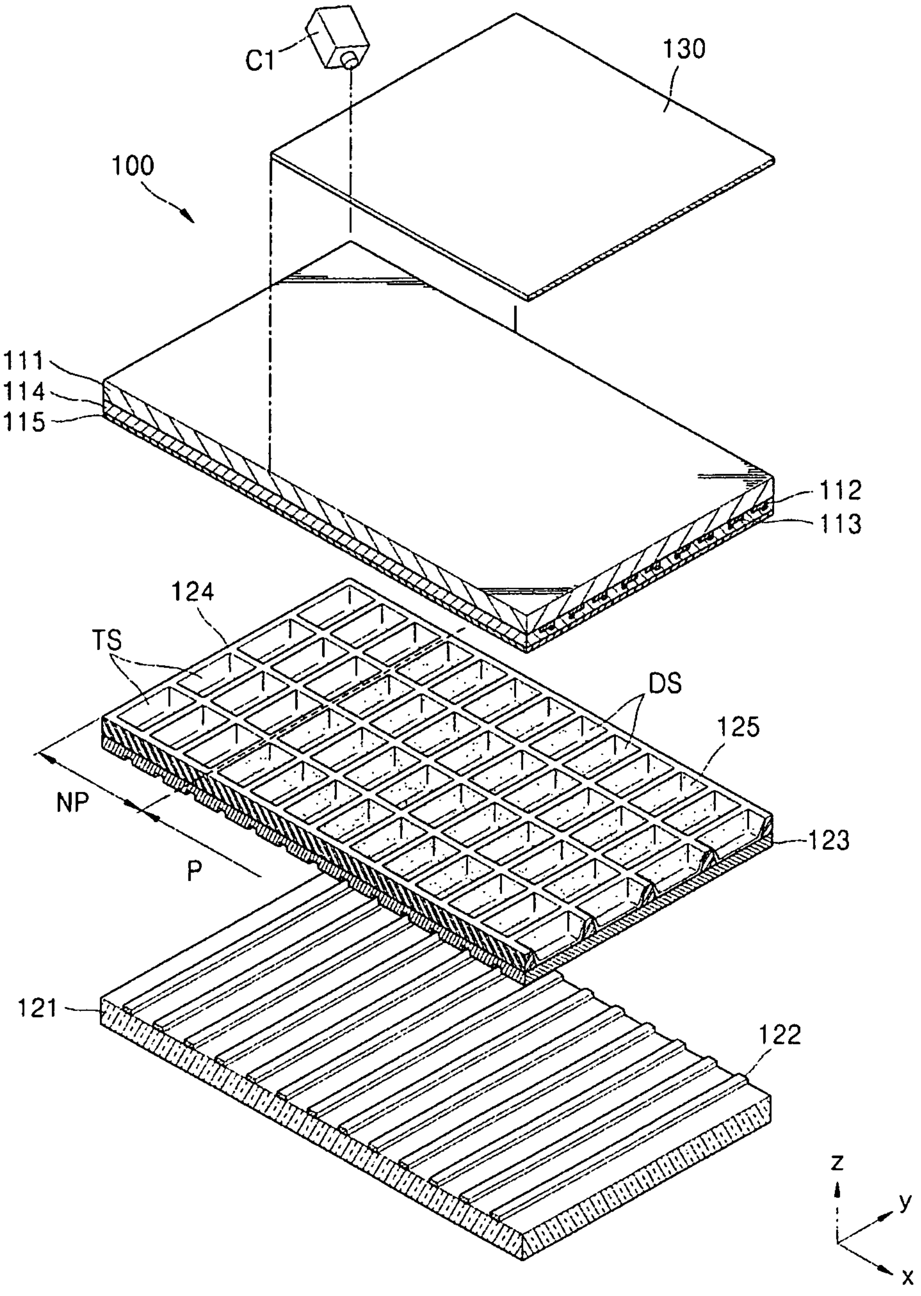
FIG. 3 is an exploded perspective view of the display apparatus illustrated in FIG. 1.

FIG. 3 is an exploded perspective view of the display panel 100 illustrated in FIG. 1. Referring to FIG. 3, the front substrate 111 and the rear substrate 121 are arranged to face each other, and the barrier ribs 124 are interposed between the front substrate 111 and the rear substrate 121, thereby defining the display cells DSs on the display area P and defining the infrared radiation cells TSs on the non-display area NP. A plurality of pairs of common electrodes (i.e., sustain electrodes) 112 and scan electrodes 113, each pair of one common electrode and one scan electrode used to generate discharges, may be arranged on the front substrate 111, and address electrodes 122 for generating addressing discharges in cooperation with the scan electrodes 113 may be formed on the rear substrate 121. Dielectric layers 114 and 123 may be formed on the front substrate 111 and the rear substrate 121, respectively, to bury (i.e., cover) and protect the pairs of common electrodes 112 and scan electrodes 113, and the address electrodes 122. A protection layer 115 with which the dielectric layer 114 is coated may be further formed on the front substrate 111. The protection layer 115 may include an MgO layer, for example.

In the embodiment shown in FIG. 3, the common electrodes 112, the scan electrodes 113, and the address electrodes 122 are formed both within and outside the display area P. By using the common electrodes 112, the scan electrodes 113, and the address electrodes 122, the display cells DSs on the display area P and the infrared radiation cells TSs on the non-display area NP generate appropriate discharges in order to perform their designed functions. The structural details of the common electrodes 112, the scan electrodes 113, and the address electrodes 122 may be uniformly maintained in both areas, namely, within and outside the display area P, due to formation of the common electrodes 112, the scan electrodes 113, and the address electrodes 122 using a common process for both the display area P and the non-display area NP.

The address electrodes 122 generate addressing discharges in cooperation with the scan electrodes 113, thereby selecting cells DSs and TSs which are to generate discharges. The display cells DSs that constitute the display area P may be turned on different numbers of times so as to conform to a brightness distribution (that is, gray levels) of an image to be displayed. However, the infrared radiation cells TSs, may be turned on by an identical number of times. That way, uniform amount of light can be generated from all of the infrared radiation cells TSs, which is desirable in the described embodiment. In addition, in order to secure a sufficient amount of light, the infrared radiation cells TSs may be turned on in all sub-fields obtained by time division. In a display panel where the common electrodes 112 and the scan electrodes 113 cross each other, the address electrodes 122 may be omitted, and the common electrodes (i.e., sustain electrodes) may serve as the address electrodes.

The display cells DSs are coated with phosphors 125. The phosphors 125 absorb ultraviolet rays generated due to discharges and convert the ultraviolet rays to visible light. For example, the phosphors 125 may be roughly classified into R, G, and B phosphors according to colors of radiated light. The infrared radiation cells TSs serving as a light source may not need the phosphors 125. More specifically, since the infrared radiation cells TSs are used to radiate infrared light IR, the infrared radiation cells TSs do not need visible light for image display. Moreover, if visible light is detected from the non-display area NP, the visible light is recognized as a noise component of an image, thereby degrading the quality of display. Accordingly, the infrared radiation cells TSs may not need the phosphors 125. However, even if the infrared radiation cells TSs were coated with the phosphors 125, they may effectively serve as a light source.

A discharge gas is injected between the front substrate 111 and the rear substrate 121. The discharge gas, for example, may be a multi-component gas that includes xenon (Xe), which can create appropriate infrared and ultraviolet rays through discharge excitation, and may include krypton (Kr), helium (He), neon (Ne), etc. in a predetermined volume ratio. For example, in a process of being ionized in reaction with a discharge voltage applied between the common electrodes 112 and the scan electrodes 113, the Xe sequentially generates infrared rays and ultraviolet rays in predetermined wavelength bands while the level of the Xe is being transitioned between multiple energy levels. These series of discharge processes occur in both display cells DSs and infrared radiation cells TSs which contain the discharge gas. However, since the display cells DSs and the infrared radiation cells TSs are designed to perform different functions, the display cells DSs are used to generate visible light for image display from the ultraviolet rays generated due to discharges, and the infrared radiation cells TSs emit the infrared rays due to the discharge to be used as detection light for a touch screen function.

Figure 4:
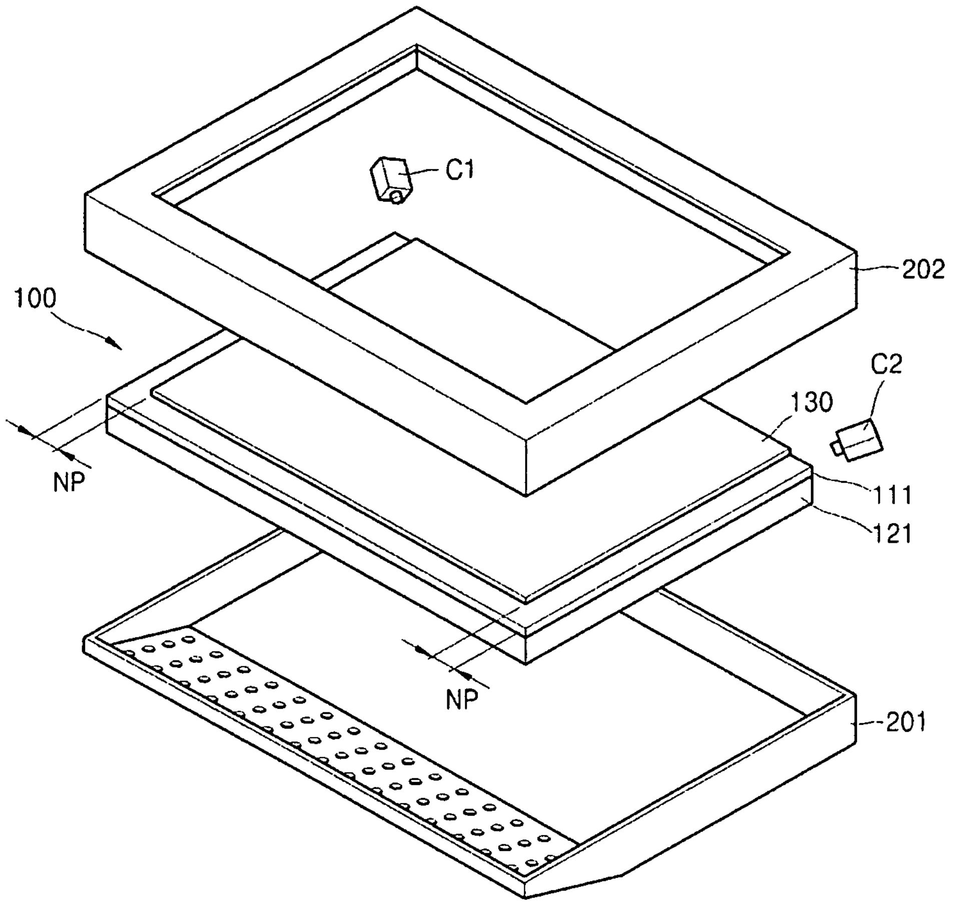
FIG. 4 is a perspective view of a display panel of the display apparatus illustrated in FIG. 1 and a case in which the display panel is received.

FIG. 4 is a perspective view of the display panel 100 illustrated in FIG. 3 and a case for receiving the display panel 100. As illustrated in FIG. 4, the display panel 100 is seated within a space formed by a front case 202 and a rear case 201 which are to be assembled. The non-display area NP, which does not perform a display function, may be covered by the front case 202 so as to prevent emission of neon light toward viewers, thereby preventing deterioration of the quality of display. By way of example, the front case 202 shown in FIG. 4 has a rectangular protruding portion that protrudes inward from the periphery of the front case 202, so as to cover the non-display area NP.

Figure 5:
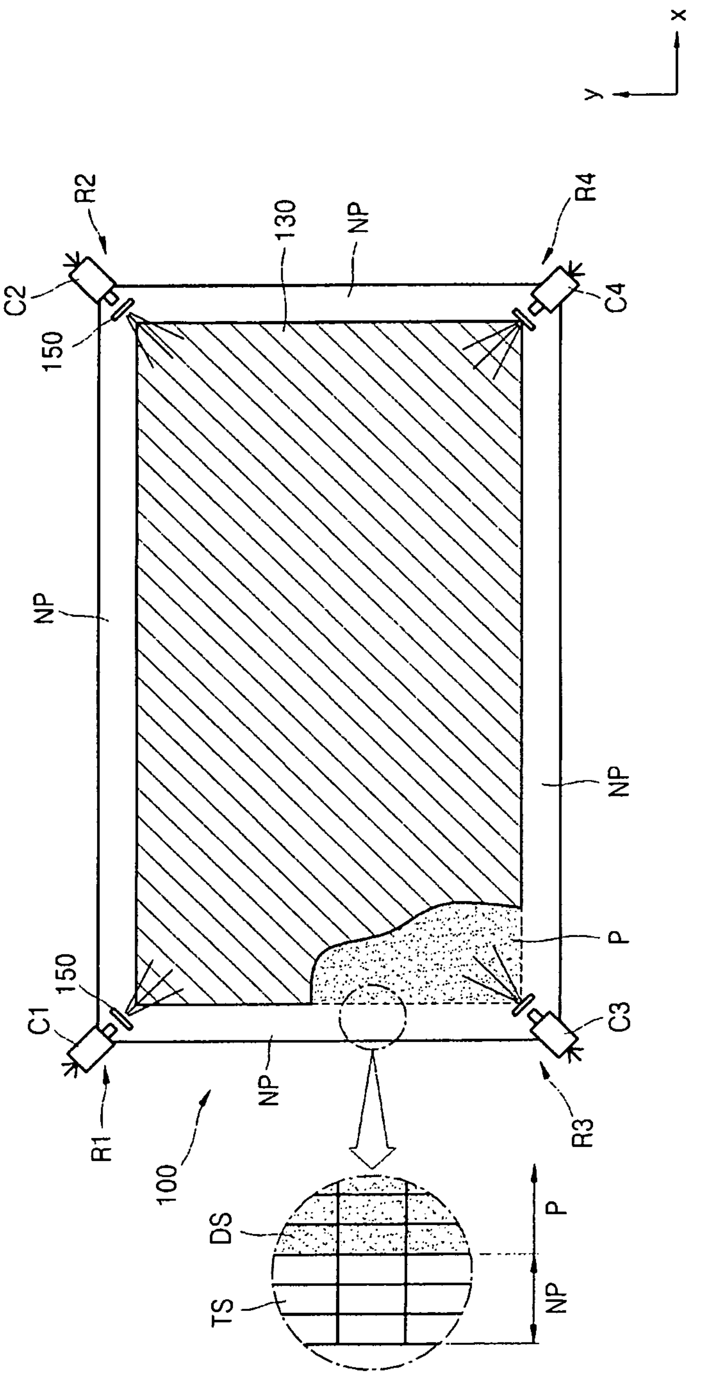
FIG. 5 illustrates partially cut-away plan view of a display apparatus according to another embodiment of the present invention, which is a modification of the display apparatus illustrated in FIG. 1.

FIG. 5 illustrates a partially cut-away plan view of a display apparatus according to another embodiment of the present invention, which is a modification of the display apparatus illustrated in FIG. 1. As illustrated in FIG. 5, a substantially rectangular display area P which includes a plurality of display cells DSs for displaying an image is located at the center of the display panel 100. Infrared radiation cells TSs are arranged on the non-display area NP along vertical and horizontal edge portions of the display panel 100 so as to surround the display area P. First, second, third, and fourth detection cameras C1, C2, C3, and C4 for receiving light blocking signals (or blocked light signals) are installed at or near four corners R1,R2,R3, and R4, respectively, of the non-display area NP.

Due to the arrangement of the infrared radiation cells TSs along the four edge portions of the display panel 100 and the installation of the first, second, third, and fourth detection cameras C1, C2, C3, and C4 at the corners R1, R2, R3, and R4, the first, second, third, and fourth detection cameras C1, C2, C3, and C4 have no dead angles. A combination of images obtained by the first, second, third, and fourth detection cameras C1, C2, C3, and C4 enables a more precise touch location to be detected. In order to perform a multi-touch function of concurrently detecting at least two touch inputs, at least three detection cameras may be required. Thus, the present embodiment of FIG. 5 is suitable for detection of multiple touches to realize a multi-touch screen display apparatus.

Figure 6:
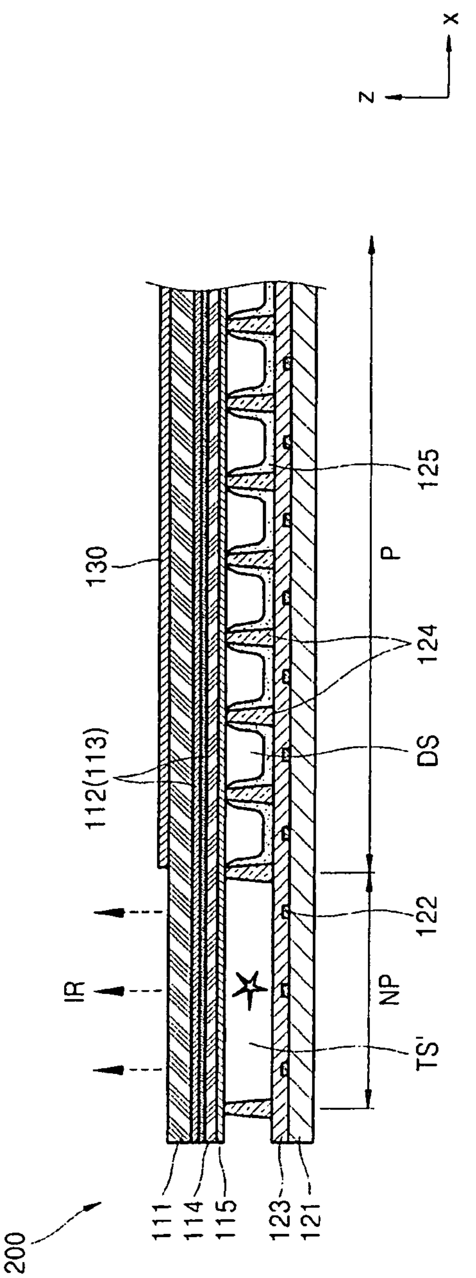
FIGS. 6, 7 and 8 are cross-sectional views of display apparatuses according to different embodiments of the present invention, which are modifications of the display apparatus illustrated in FIG. 2.

FIG. 6 is a cross-sectional view of a display apparatus according to another embodiment of the present invention that includes a display panel 200, which is a modification of the display panel 100 illustrated in FIG. 2. The display panel 200 is substantially the same as the display panel 100 of FIG. 2 except for the width of the infrared radiation cell TS'. Therefore, for the convenience of description, substantially the same elements will not be described again.

Referring to FIG. 6, a plurality of display cells DSs are defined within the display area P by interposing the barrier ribs 124 between the front substrate 111 and the rear substrate 121 that face each other.

A wide infrared radiation cell TS', which is not partitioned by barrier ribs to have a large discharge space is formed on the non-display area NP. The display cells DSs, forming the display area P, are separated from one another by the barrier ribs 124 and are thus not affected by discharge interference or optical interference, thereby constituting independent light-emission units. The infrared radiation cell TS' on the non-display area NP is not partitioned by any barrier ribs and thus has a wide discharge space, thereby the intensity of light generated by the infrared radiation cell TS' is improved (or increased).

In one embodiment, a single wide infrared radiation cell TS' is formed along the horizontal and vertical sides (or edge portions) of the display panel 200 without any partition by the barrier ribs. In other embodiments, the barrier ribs extending in the x direction partition the infrared radiation cells TS's such that a single column of radiation cells TS's is formed at each vertical side of the display panel 200. Further, the infrared radiation cells TS's along the horizontal side (or horizontal sides) of the display panel 200 may be partitioned by the barrier ribs extending in the y direction (see FIG. 1), such that each of the infrared radiation cells TS's positioned along the horizontal side(s) has substantially the same width as the infrared radiation cells TS' positioned along the vertical sides of the display panel 200.

Figure 7:
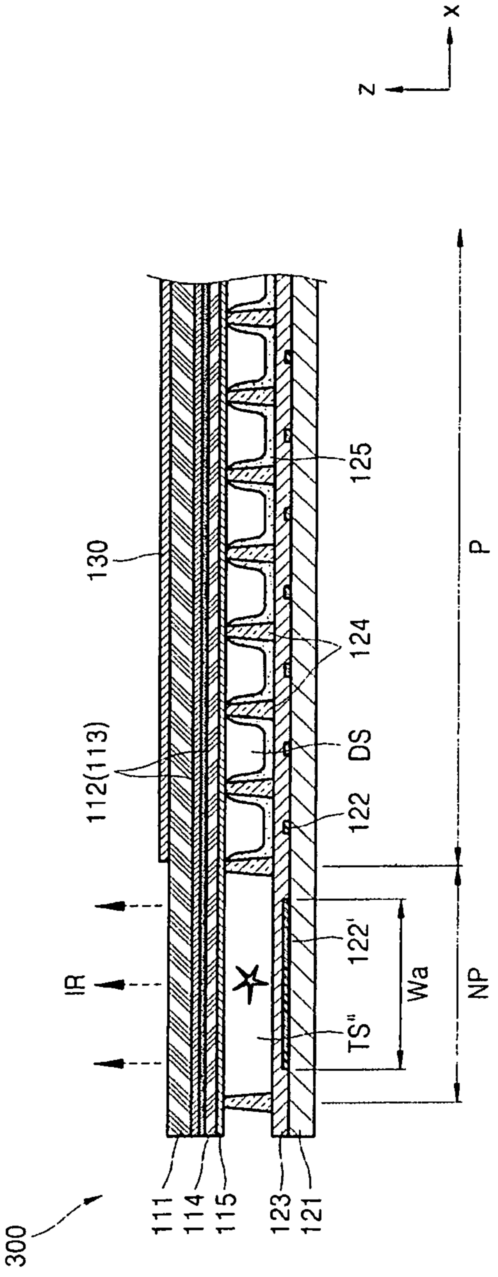

FIG. 7 is a cross-sectional view of a display apparatus according to another embodiment of the present invention that includes a display panel 300, which is another modification of the display panel 100 illustrated in FIG. 2. The display panel 200 is substantially the same as the display panel 200 of FIG. 6 except for the width of the address electrode 122' in the infrared radiation cell TS". Therefore, for the convenience of description, substantially the same elements will not be described again.

Referring to FIG. 7, the display cells DSs are defined within the display area P by the barrier ribs 124, and an infrared radiation cell TS" which has a large discharge space and includes an address electrode 122' with a large width Wa is formed on the non-display area NP. In order to sufficiently utilize the wide discharge space provided by the infrared radiation cell TS" and form a uniform discharge electric field across the wide discharge space, in one exemplary embodiment, the address electrode 122' has a width that is wider than the width of the address electrodes 122 in the display area P.

Figure 8:
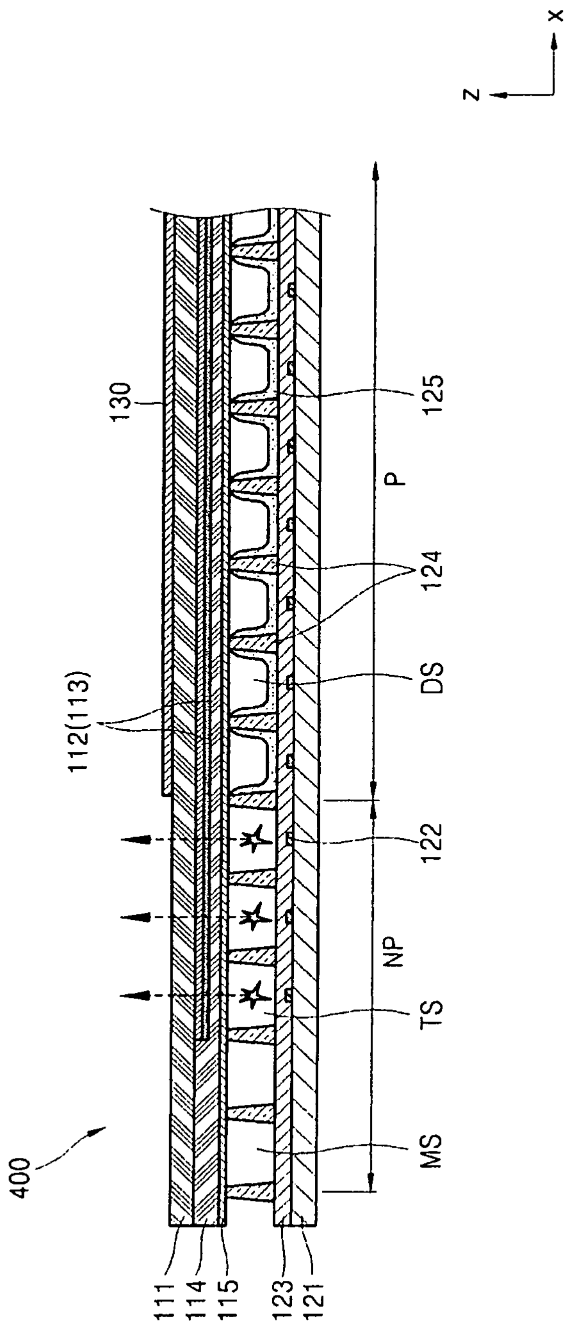

FIG. 8 is a cross-sectional view of a display apparatus according to another embodiment of the present invention that includes a display panel 400, which is another modification of the display panel 100 illustrated in FIG. 2. The display panel 400 is substantially the same as the display panel 100 of FIG. 2 except for the formation of dummy cells MS arranged along the outer periphery of the infrared radiation cells TS. Therefore, for the convenience of description, substantially the same elements will not be described again.

Referring to FIG. 8, both a plurality of display cells DSs formed in the display area P and a plurality of infrared radiation cells TSs formed in the non-display area NP include the common electrodes 112, the scan electrodes 113, and the address electrodes 122 and generate appropriate plasma discharges. The dummy cells MSs including no address electrodes 122 are arranged outside the infrared radiation cells TSs. In other words, the dummy cells MSs are arranged along the outer periphery of the infrared radiation cells TSs in the non-display area NP.

The dummy cells MSs are not designed to generate discharges but to provide a margin in consideration of a process error possibly generated during the manufacture of the display panel 100. Alternatively, in other embodiments, the dummy cells MSs may include only one of but not both the common electrodes 112 and the scan electrodes 113.

Figure 9:
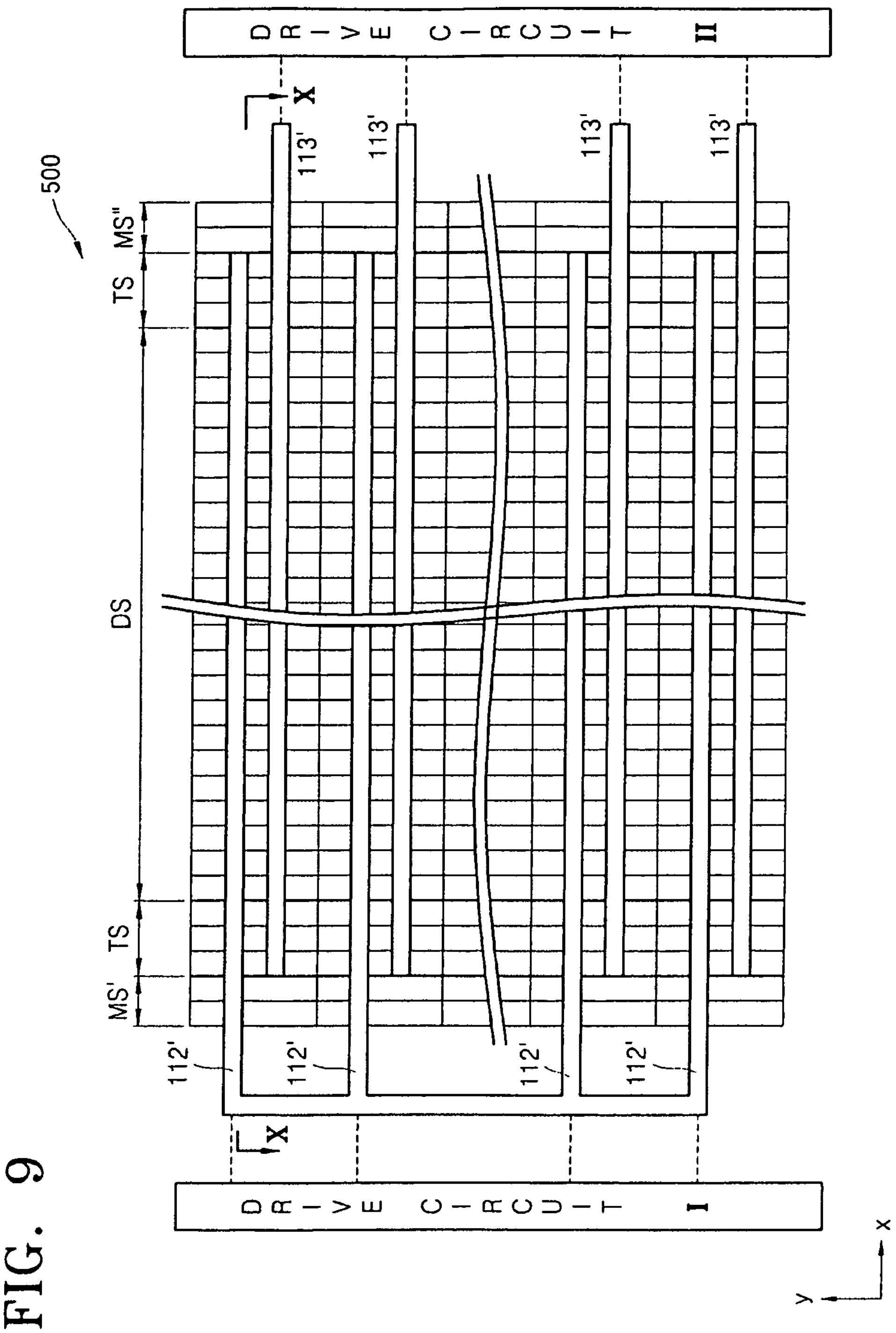
FIG. 9 is a schematic partial plan view of a display apparatus according to another embodiment of the present invention.

FIG. 9 is a schematic partial plan view of a display panel 500 according to another exemplary embodiment of the present invention. The display panel 500 includes a plurality of display cells DSs, a plurality of infrared radiation cells TSs, and a plurality of dummy cells MS' and MS". The display panel 500 also includes a plurality of common electrodes (i.e., sustain electrodes) 112' and the plurality of scan electrodes 113'. Each common electrode 112' forms a pair with a corresponding scan electrode 113' and extends in the x direction substantially across the display panel 500 in parallel with the scan electrodes 113'. As shown in FIG. 9, the common electrodes 112' are coupled together at one end.

The display panel 500 is different from the display panel 100 of FIG. 2 in that the common electrodes 112' and the scan electrodes 113' do not extend all the way in the x direction to both the left and right edges of the display panel. For example, as shown in FIG. 9, the common electrodes 112' extend across and over the dummy cells MS' at the left edge of the display panel, but do not extend beyond the infrared radiation cells TS, such that the dummy cells MS" located along the right edge of the display panel 500 do not have the common electrodes 112'. Similarly, the scan electrodes 113" extend across and over the dummy cells MS" at the right edge of the display panel 500, but do not extend beyond the infrared radiation cells TS, such that the dummy cells MS' located along the left edge of the display panel 500 do not have the scan electrodes 113'.

The display apparatus of FIG. 9 also includes a drive circuit I located near the left edge of the display panel 500 and a drive circuit II located near the right edge of the display panel 500. The drive circuit I provides driving signals (e.g., sustain pulses) to the common electrodes 112', and the drive circuit 11 provides driving signals (e.g., scan signals and sustain pulses) to the scan electrodes 113'.

Figure 10:
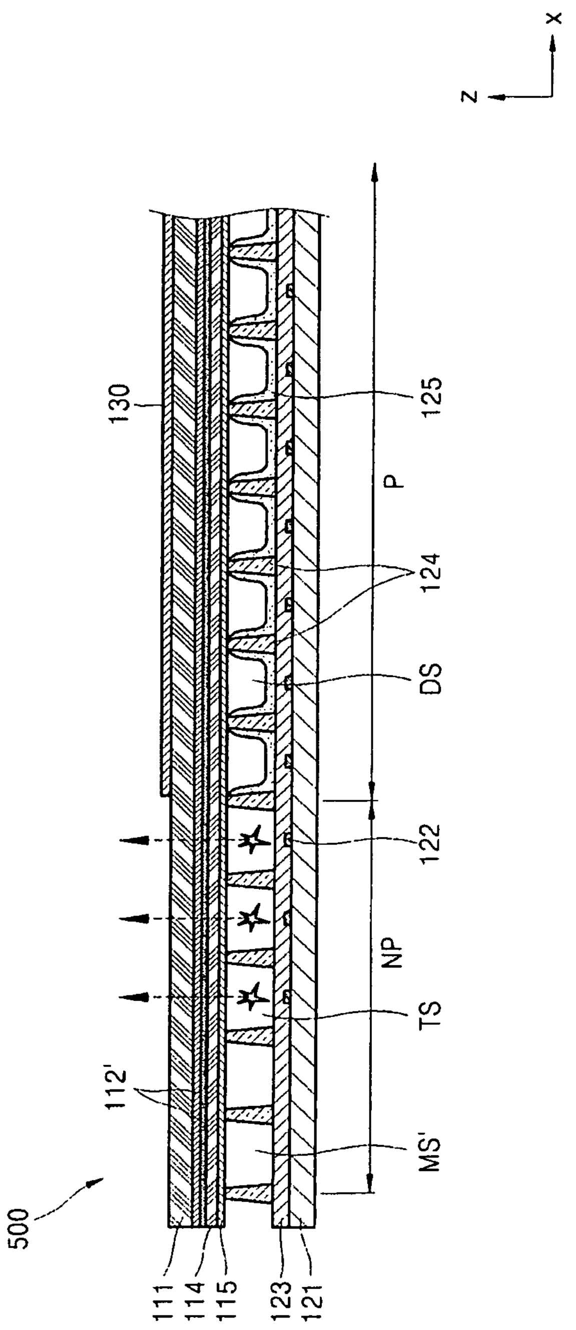
FIG. 10 is a cross-sectional view of the display apparatus of FIG. 9 taken along the line X-X.

FIG. 10 is a cross-sectional view of the display apparatus of FIG. 9 taken along the line X-X. As can be seen in FIG. 10, the common electrode 112' extends across and over the dummy cells MS', unlike the display panel 400 shown in FIG. 8, in which the common electrode 112 (and the scan electrode 113) does not extend beyond the infrared radiation cells TS.

Figure 11:
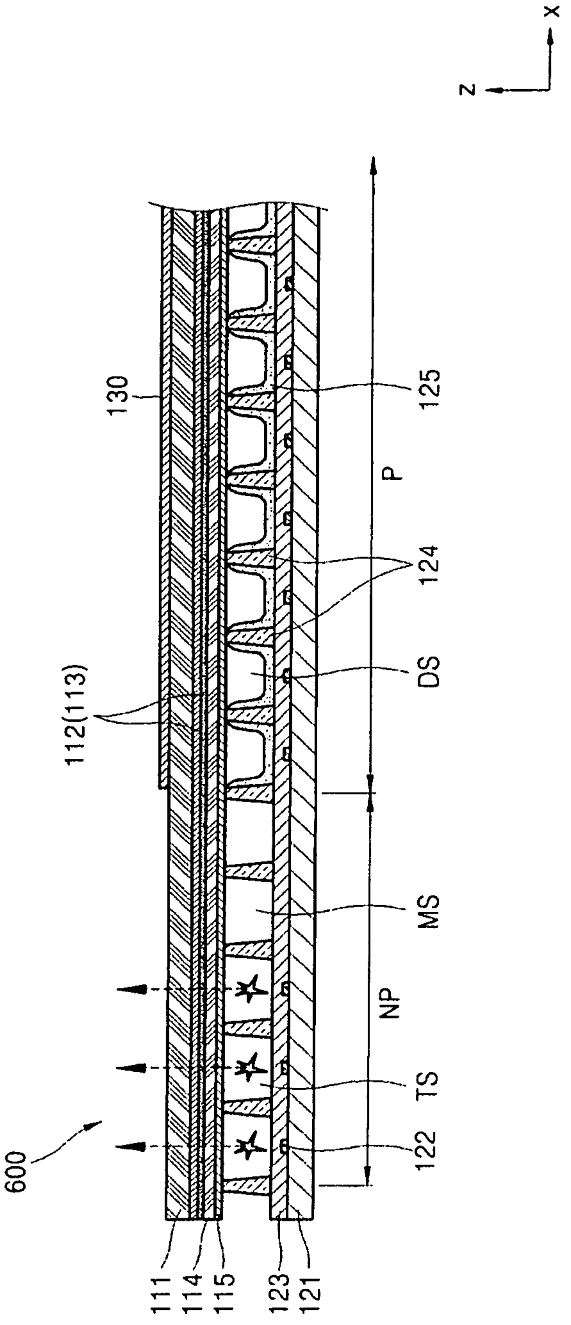
FIG. 11 is a cross-sectional view of a display apparatus according to another embodiment of the present invention.

FIG. 11 is a cross-sectional view of another exemplary embodiment according to the present invention including a display panel 600, which is a modification of the display panel 100 illustrated in FIG. 8. The display panel 600 is substantially the same as the display panel 400 of FIG. 8 except that the dummy cells MS are arranged along the inner (and not outer) periphery of the infrared radiation cells TS. Therefore, for the convenience of description, substantially the same elements will not be described again.

Referring to FIG. 11, infrared radiation cells TSs are located at the outermost area along the outer periphery of the display panel 600, and dummy cells MSs and display cells DSs are sequentially arranged inward from the infrared radiation cells TSs. This configuration is different from the embodiment of FIG. 8. The dummy cells may not include the address electrodes as shown in FIG. 11.

Figure 12:
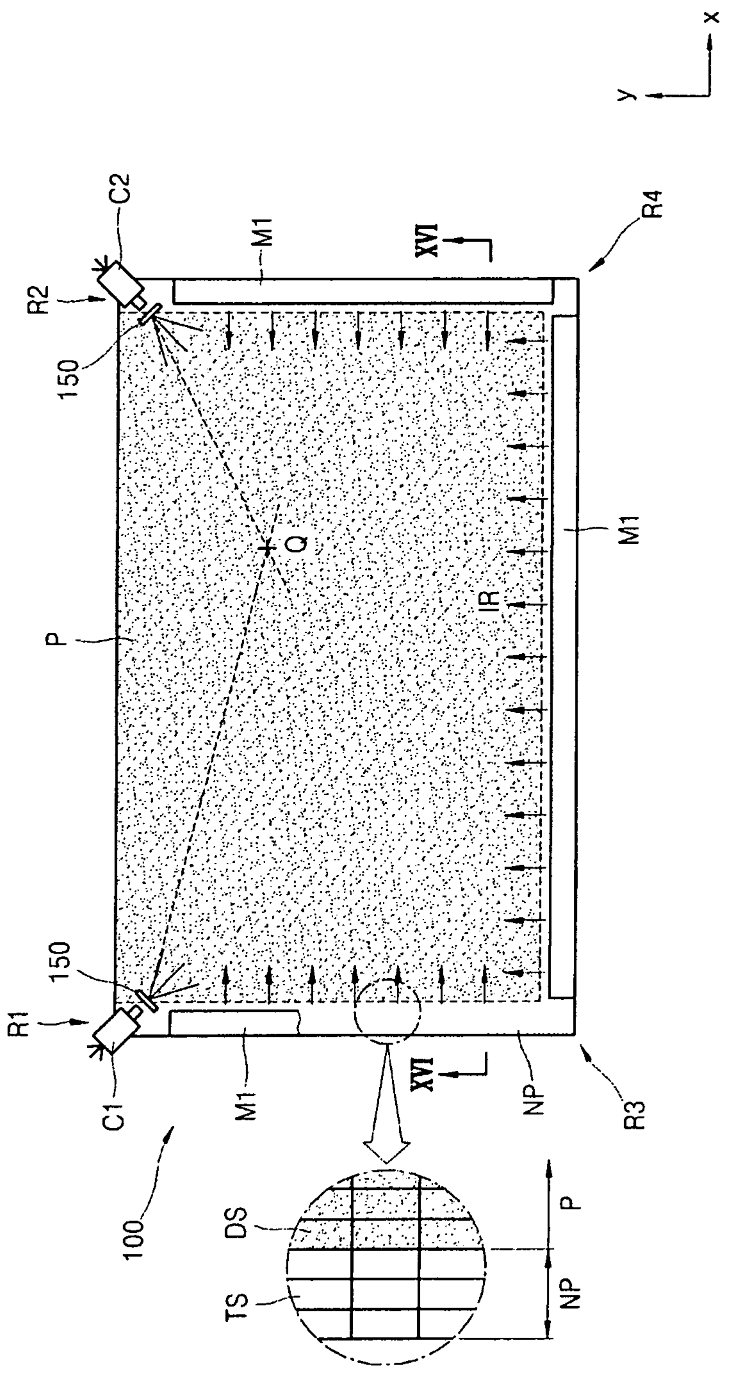
FIG. 12 illustrates a plan view of a display apparatus according to another embodiment of the present invention.

FIG. 12 illustrates a plan view of a display apparatus according to another embodiment of the present invention. Referring to FIG. 12, the display apparatus includes a display panel 100 for displaying an image, and first and second detection cameras C1 and C2 for detecting a touched location Q on the display panel 100 according to an optical method.

A substantially rectangular display area P which includes a plurality of display cells DSs for displaying an image is located at the center of the display panel 100. Infrared radiation cells TSs are arranged on a non-display area NP which partially surrounds (i.e., surrounds at 3 of the 4 sides or edges) the display area P. The display cells DSs constitute the display area P and generate visible light for displaying an image. The infrared radiation cells TSs are arranged on the non-display area NP and serve as a light source which supplies infrared light IR generated due to discharges.

In the present embodiment, a reflection mirror M1 is installed at the non-display area NP. The reflection mirror M1 is arranged on the paths of light emitted by the infrared radiation cells TSs and reflects infrared light IR emitted from the non-display area NP toward the display area P so that the reflected infrared light IR can be applied to the first and second detection cameras C1 and C2 through and over the display area P. In one embodiment, the reflection mirror M1 is made of polished steel. In other embodiments, the reflection mirror M1 may include a base/support and a relatively thin mirror fixed (or attached) to the base/support to provide a reflection surface.

The infrared light IR propagating across the display area P is converted to a light blocking signal (i.e., a blocked light signal) when light intensity significantly drops at the touched location Q on the display area P. The light blocking signal is received by the first and second detection cameras C1 and C2. The reflection mirror M1 may have a flat reflection surface and be inclined a predetermined angle which is suitable to redirect the lights output from the infrared radiation cells TSs toward the display area P. The reflection mirror M1 may be installed at a location that does not block visible light emitted from the display area P.

The first and second detection cameras C1 and C2, for receiving light blocking signals, are arranged at different corners of the display panel 100. As illustrated in FIG. 12, the first and second detection cameras C1 and C2 may be arranged at first and second corners R1 and R2, respectively, which are upper left and upper right corners of the display panel 100. At least two cameras are installed to face the entire surface of the display area P, to capture the image of the entire surface of the display area P while having facing angles that cross each other. In one embodiment, the angle of view of the cameras is about 90 degrees. In some cases, optical lens units (not shown) having wide angles close to or greater than 90 degrees may be installed in front of the first and second detection cameras C1 and C2, so as to prevent generation of dead angles of the first and second detection cameras C1 and C2.

Figure 13:
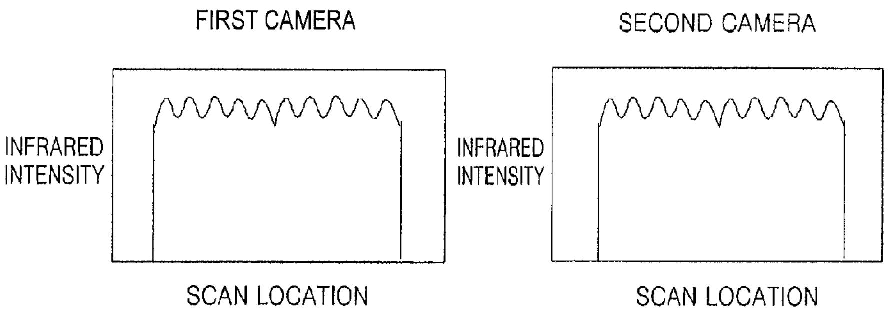
FIG. 13 illustrates profiles of infrared intensities captured by detection cameras, more specifically, infrared intensities captured when there are no touch inputs on a display panel of the display apparatus illustrated in FIG. 12.

If there are no touch inputs on the display area P, as illustrated in FIG. 13, infrared intensities captured by the first and second detection cameras C1 and C2 have only ripple components, that is, have no rapid changes. However, if an arbitrary location on the display area P is touched, the infrared intensities of the first and second detection cameras C1 and C2 have rapid changes according to light blockage.

Figure 14:
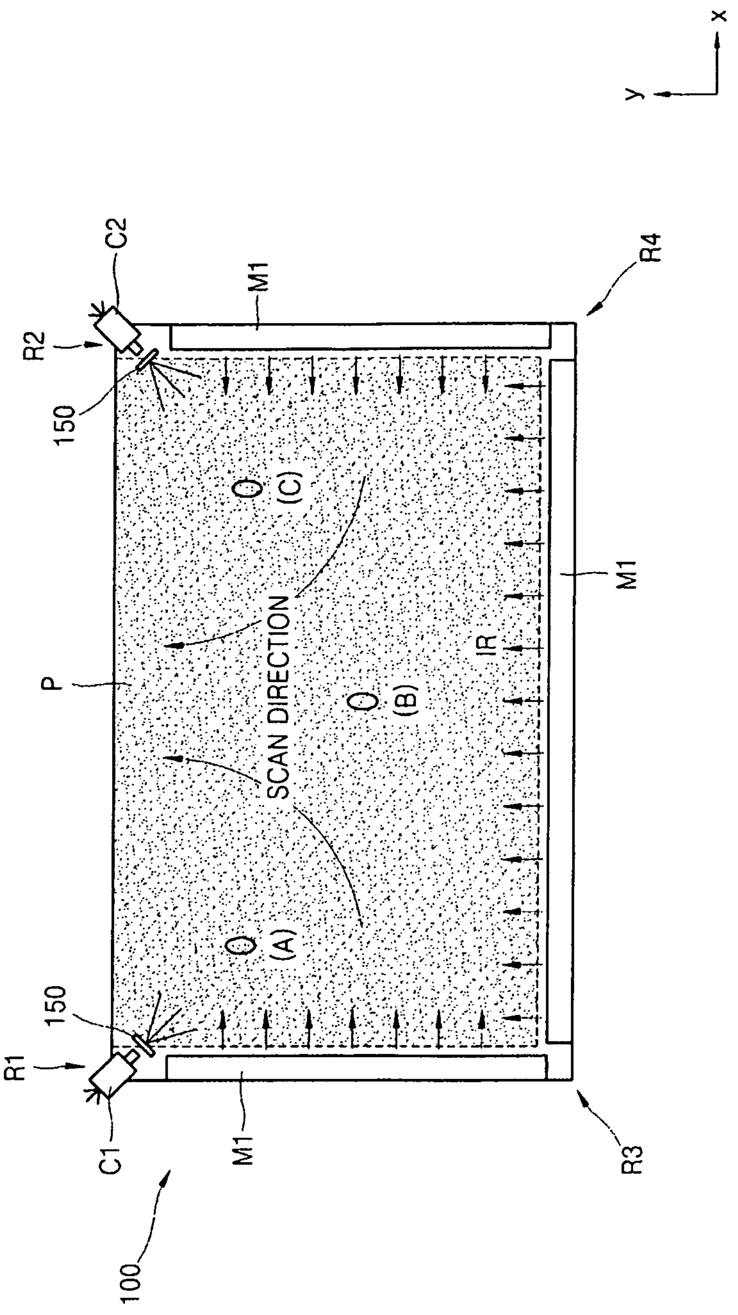
FIG. 14 illustrates a touched location on the display panel of the display apparatus illustrated in FIG. 12.

As illustrated in FIG. 14, when it is assumed that different locations (A), (B), and (C) on the display area P are touched and the first and second detection cameras C1 and C2 scan the display area P in directions as shown in FIG. 14, infrared intensities captured by the first and second detection cameras C1 and C2 have profiles in which the infrared intensities rapidly drop at specific locations in the scanning directions.

By way of example, in one embodiment, when two detection cameras (e.g., C1 and C2) are used and there are 60 frames (or images) per second being displayed, the cameras may alternately capture IR images. Hence, in this case, each camera would capture an IR image every 1/30 second. In other embodiments, both cameras (or more cameras when used) may concurrently capture each frame of the IR images.

Figure 15A:
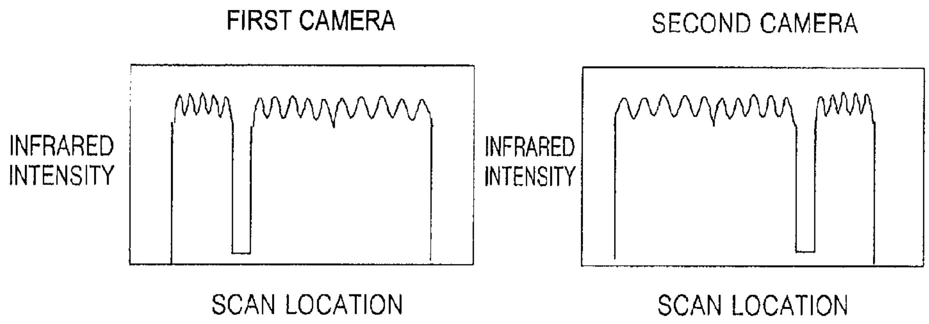
FIGS. 15A, 15B and 15C illustrate profiles of infrared intensities captured by detection cameras, more specifically, infrared intensities captured when locations (A), (B), and (C) illustrated in FIG. 14 are touched.
Figure 15B:
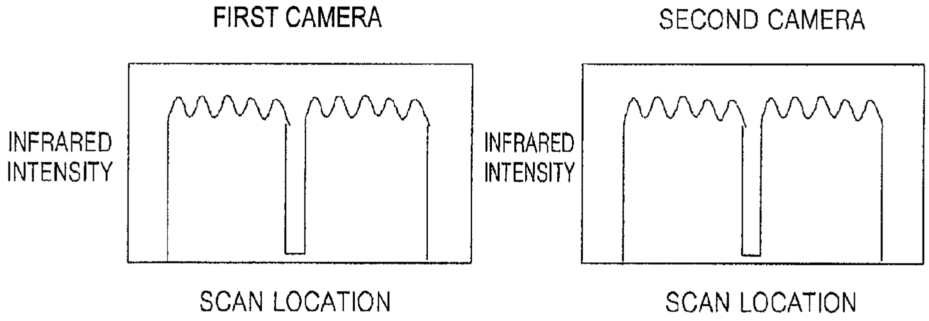
Figure 15C:
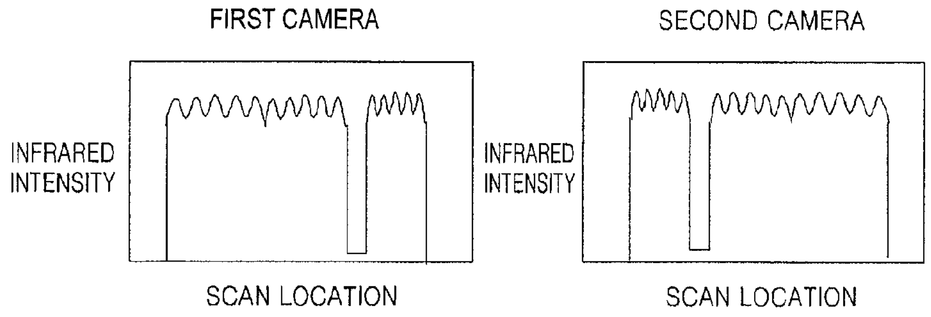

As shown in FIG. 15A, when the location (A) was touched, the first detection camera C1 observes a rapid drop of infrared intensity at a scanned location on the left side and the second detection camera C2 observes a rapid drop of infrared intensity at a scanned location on the right side. As shown in FIG. 15C, when the location (C) was touched, the first detection camera C1 observes a rapid drop of infrared intensity at a scanned location on the right side and the second detection camera C2 observes a rapid drop of infrared intensity at a scanned location on the left side. As shown in FIG. 15B, when the location (B) was touched, the first and second detection cameras C1 and C2 observe rapid drops of infrared intensities at scanned locations at or near the center.

To determine the touched position based on the scan location of the light blocking signals in the first and second detection cameras C1 and C2, in one embodiment, a look up table (LUT) may be used. For example, the look up table may have the scan locations of the light blocking signals detected by the first and second detection cameras C1 and C2 as inputs and has the position (e.g., x and/or y coordinates or column and/or row information of the pixel) as an output.

Figure 16:
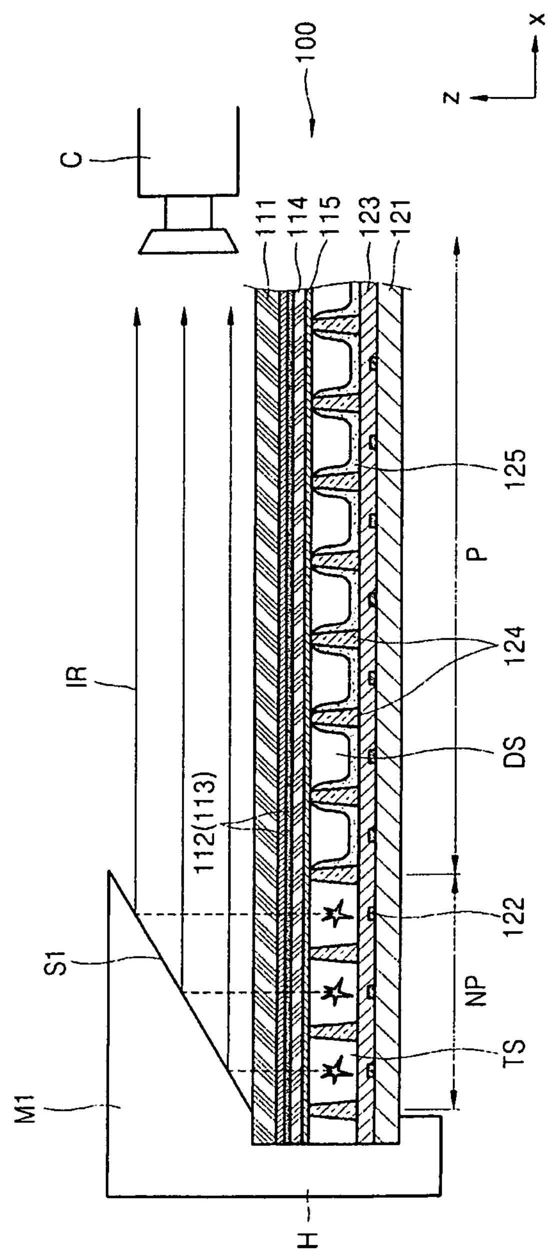
FIG. 16 is a cross-sectional view taken along the line XVI-XVI of FIG. 12.

FIG. 16 is a cross-sectional view taken along the line XVI-XVI of FIG. 12. Referring to FIG. 16, barrier ribs 124 are interposed between a front substrate 111 and a rear substrate 121 which face each other, thereby defining a plurality of display cells DSs on a display area P and defining a plurality of infrared radiation cells TSs on a non-display area NP. A plurality of pairs of common electrodes 112 and scan electrodes 113, each pair used to generate discharges, may be arranged on the front substrate 111, and address electrodes 122 may be formed on the rear substrate 121.

The common electrodes 112, the scan electrodes 113, and the address electrodes 122 may be formed both within and outside the display area P. By using the common electrodes 112, the scan electrodes 113, and the address electrodes 122, the display cells DSs on the display area P and the infrared radiation cells TSs on the non-display area NP generate appropriate discharges. However, phosphors 125 may be formed within the display cells DSs that display an image, and phosphors 125 may not be formed within the infrared radiation cells TSs.

A reflection mirror M1 is installed at the non-display area NP. The reflection mirror M1 reflects infrared light IR emitted upward from the non-display area NP and changes the path of the infrared light IR so as to be parallel to the surface of the display area P, so that the infrared light IR can cross over the display area P and be applied to a detection camera C. At this time, the infrared light IR crossing over the display area P is interrupted by a touch of an external object (e.g., finger) on the display area P and converted into a light blocking signal (or blocked light signal). The light blocking signal is then applied to the detection camera C.

As illustrated in FIG. 16, the reflection mirror M1 may have a flat reflection surface S1 which has a predetermined angle suitable for reflecting the infrared light IR generated by the infrared radiation cells TSs toward the area over the display area P. In one embodiment, the predetermined angle is 45 degrees. The predetermined angle can be different in other embodiments. The reflection mirror M1 may include a holder H that can be fitted onto the edge of the display panel 100. Alternatively, the reflection mirror M1 may be attached onto the display panel 100 by using a suitable adhesive or fastening device (not shown, e.g., screw or bolt).

Figure 17:
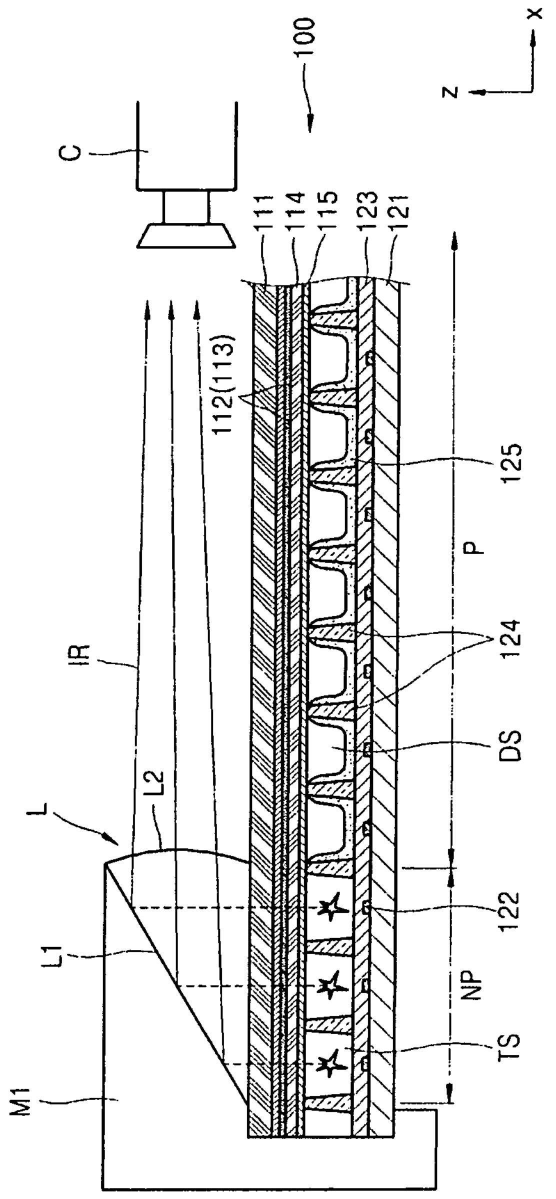
FIG. 17 is a cross-sectional view of a display apparatus according to another embodiment of the present invention, which is a modification of the display apparatus illustrated in FIG. 16.

FIG. 17 is a cross-sectional view of a display apparatus, which is a modification of the display apparatus illustrated in FIG. 16. Referring to FIG. 17, a convex prism L which has a light incidence surface L1 contacting or located close to the reflection mirror M1 installed at the non-display area NP and has a convex light-emitting surface L2, is installed in front of the reflection mirror M1. Infrared light IR emitted upward from infrared radiation cells TSs is reflected by the reflection mirror M1 and is incident upon the convex prism L. Then, the infrared light IR is refracted by the convex prism L and thus transformed into convergent light, and the convergent light crosses over the display area P and is applied to the detection camera C.

The convex prism L allows the infrared light IR emitted upward from the infrared radiation cells TSs to converge onto the detection camera C instead of diverging, thereby increasing light intensity captured by the detection camera C. In order to increase the intensity of the infrared light IR generated by the infrared radiation cells TSs, the number of discharges or a discharge intensity which is directly related to power consumption of the display panel 100 typically needs to be increased. Thus, an optical method using the convex prism L is used in this embodiment.

Figure 18:
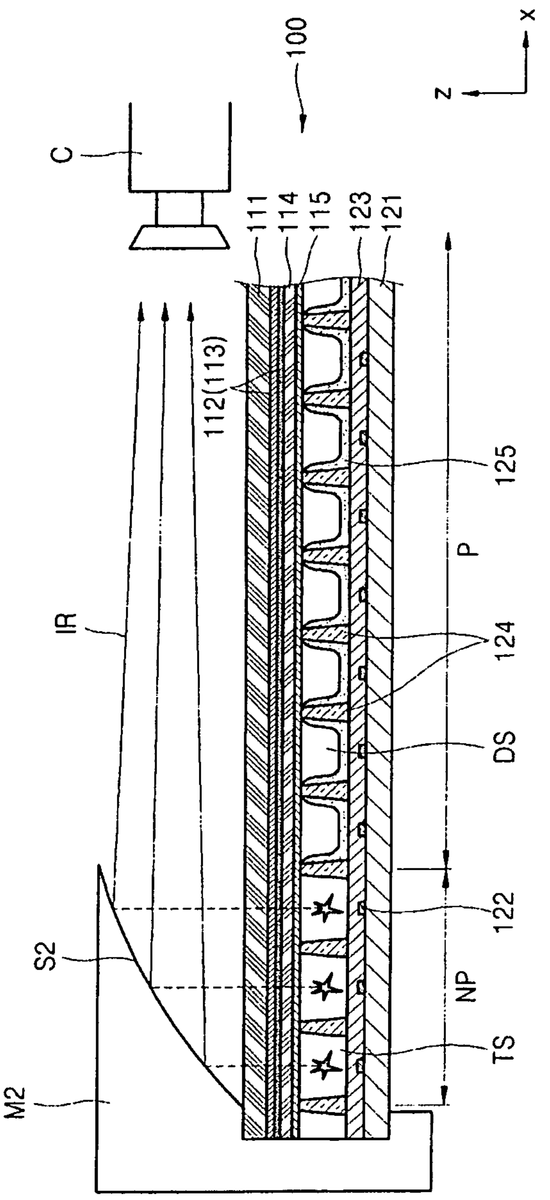
FIG. 18 is a cross-sectional view of a display apparatus according to another embodiment of the present invention, which is another modification of the display apparatus illustrated in FIG. 16.

FIG. 18 is a cross-sectional view of a display apparatus, which is another modification of the display apparatus illustrated in FIG. 16. Referring to FIG. 18, a concave mirror having a concave reflection surface S2 is used as a reflection mirror M2 which changes a direction in which light emitted from the infrared radiation cells TSs propagates.

The concave reflection surface S2 reflects infrared light IR emitted upward from the infrared radiation cells TSs toward the display area P. More specifically, the concave reflection surface S2 allows the infrared light IR propagating over the display area P to converge onto the detection camera C instead of diverging, by improving the straight advancement of reflected light or transforming the reflected light into convergent light. Thus, the concave reflection surface S2 increases light intensity captured by the detection camera C. In the described embodiment of the present embodiment, light intensity enough to detect a location can be secured without power consumption of the display panel 100, by increasing the light intensity captured by the detection camera C according to an optical method using a concave mirror.

Figure 19:
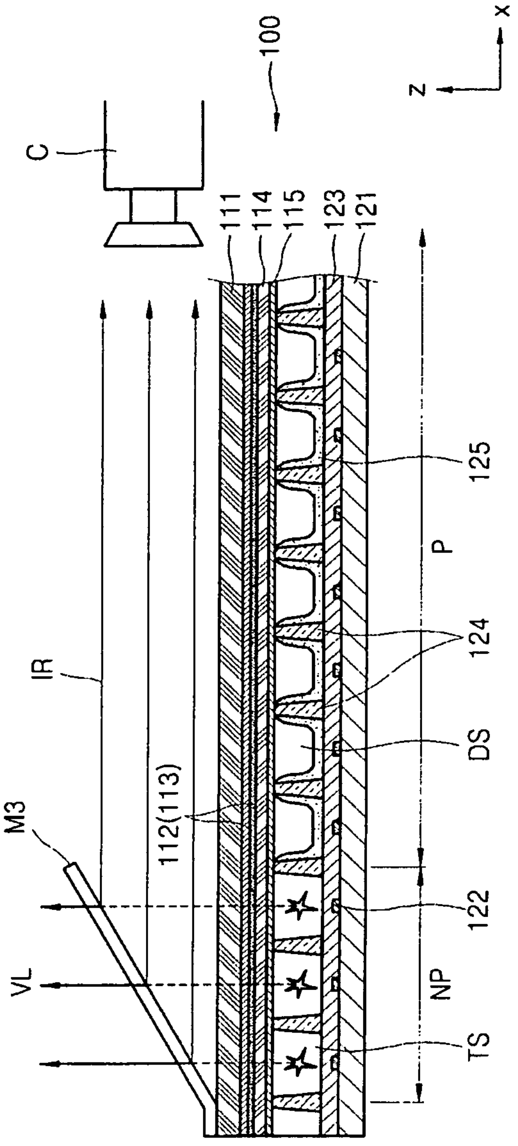
FIG. 19 is a cross-sectional view of a display apparatus according to another embodiment of the present invention, which is another modification of the display apparatus illustrated in FIG. 16.

FIG. 19 is a cross-sectional view of a display apparatus according to another embodiment of the present invention, which is another modification of the display apparatus illustrated in FIG. 16. The display apparatus of FIG. 19 is substantially the same as the display apparatus of FIG. 16 except for the structure of the mirror M3. For the convenience of description, the elements of the display apparatus of FIG. 19 that are substantially the same as those of FIG. 16 will not be described again.

The display apparatus of FIG. 19 includes a transmissive/reflective mirror M3 instead of the mirror M1 as shown in FIG. 16. The transmissive/reflective mirror M3 reflects the infrared light IR toward the camera C while it passes through (or transmits) the visible light VL. This way, any visible light component of the light incident upon the transmissive/reflective mirror M3 is prevented from being detected by the camera C, thereby creating noise. The transmissive/reflective mirror may be made of a material selected from the group consisting of oxidized titanium, oxidized silicon, and combinations thereof, or any other suitable material.

A display apparatus according to exemplary embodiments of the present invention performs a touch screen function by using infrared light generated according to a light emission mechanism. Thus, costs typically required to install a light emitting display (LED) array as a light source are not required, and a precise touch screen having a high resolution equivalent to the resolution of an image can be provided.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A display device comprising:

a plasma display panel comprising a substrate comprising a first region, and a second region at least partly surrounding the first region, the first region being a display region and the second region being a non-display region; and a plurality of barrier ribs located on the substrate, wherein a plurality of display cells for displaying an image is defined by the barrier ribs on the first region of the substrate, and a plurality of light generation cells for generating light, different from the image, to be detected for touch position sensing, is defined by the barrier ribs on the second region of the substrate; and a pair of cameras located at or near a periphery of the plasma display panel, aligned with respective crossing directions across the plasma display panel, and oriented to detect the light generated by the light generation cells to determine a touch position of an object on the plasma display panel, wherein the light is infrared.

2. The display device according to claim 1, wherein the pair of cameras are located at respective corners of the display panel.

3. The display device according to claim 1, wherein each of the display cells comprises a phosphor therein, and none of the light generation cells has a phosphor therein.

4. The display device according to claim 1, wherein the cameras are oriented at a downward angle with respect to a display surface of the plasma display panel suitable for detecting the light generated by the light generation cells.

5. The display device according to claim 1, wherein the cameras are oriented to focus in a direction parallel to a display surface of the plasma display panel.

6. The display device according to claim 1, wherein the plasma display panel further comprises a plurality of dummy cells located along an outer periphery of the second region.

7. The display device according to claim 6, wherein each of the dummy cells comprises only one of a scan electrode or a common electrode.

8. The display device according to claim 6, wherein the dummy cells do not include address electrodes.

9. The display device according to claim 1, wherein the plasma display panel further comprises a plurality of dummy cells between the first region and the second region.

10. The display device according to claim 9, wherein the dummy cells do not include address electrodes.

11. The display device according to claim 1, wherein at least one of the light generation cells has a width that is wider than that of the display cells.

12. The display device according to claim 11, wherein the plasma display panel further comprises a plurality of common electrodes, a plurality of scan electrodes and a plurality of address electrodes crossing the common electrodes and the scan electrodes, the address electrodes extending along the plurality of discharge display cells and the plurality of light generation cells, an address electrode among the address electrodes corresponding to the at least one of the light generation cells having a width that is wider than that of the address electrodes corresponding to the display cells.

13. The display device according to claim 1, further comprising another camera located at or near the periphery of the plasma display panel, aligned with a crossing direction across the plasma display panel that is different from the crossing directions of the pair of cameras, and oriented to detect the light generated by the light generation cells.

14. The display device according to claim 1, further comprising a second pair of cameras located at or near the periphery of the plasma display panel, aligned with different crossing directions across the plasma display panel from the crossing directions of the pair of cameras, and oriented to detect the light generated by the light generation cells.

15. The display device according to claim 14, wherein the crossing directions are diagonal directions of the plasma display panel.

16. The display device according to claim 1, further comprising at least one mirror for directing the light generated by the light generation cells toward the pair of cameras.

17. The display device according to claim 16, wherein the at least one mirror comprises a transmissive/reflective mirror configured to reflect infrared light while passing through visible light.

18. The display device according to claim 17, wherein the at least one mirror comprises a material selected from the group consisting of oxidized titanium, oxidized silicon, and combinations thereof.

19. The display device according to claim 16, wherein the at least one mirror comprises polished stainless steel.

20. The display device according to claim 16, wherein the at least one mirror is mounted on a base located at the periphery of the plasma display panel.

21. The display device according to claim 16, wherein the at least one mirror has a sloped face for directing the generated light toward the pair of cameras.

22. The display device according to claim 21, further comprising at least one convex prism, the convex prism adjacent to the sloped face, so as to converge the generated light to the cameras.

23. The display device according to claim 16, wherein the at least one mirror has a concave face for converging the generated light toward the cameras.

24. The display device according to claim 16, wherein the at least one mirror is located along the periphery of the plasma display panel.

25. The display device according to claim 1, further comprising an infrared light blocking filter on the first region.

26. The display device according to claim 1, further comprising an infrared transmission filter in front of at least one of the cameras.

27. A method of sensing a touch position of an object on a display device comprising a plasma display panel, a first camera and a second camera, the plasma display panel comprising a substrate comprising a first region, and a second region at least partly surrounding the first region, the first region being a display region and the second region being a non-display region, and a plurality of barrier ribs located on the substrate, wherein a plurality of display cells for displaying an image is defined by the barrier ribs on the first region of the substrate, and a plurality of light generation cells for generating light, different from the image, to be detected for touch position sensing, is defined by the barrier ribs on the second region of the substrate, wherein the light is infrared light and the method comprising:

detecting the generated light from the light generation cells defined by the barrier ribs on the substrate with the first camera aligned with a first direction across the plasma display panel;

detecting the generated light from the light generation cells defined by the barrier ribs on the substrate with the second camera aligned with a second direction across the plasma display panel, the second direction crossing the first direction; and determining the touch position of the object by comparing detection signals of the first and second cameras.

28. A plasma display device comprising:

a display panel comprising:

a first substrate;

a second substrate spaced from and facing the first substrate; and a plurality of barrier ribs between the first and second substrates, the barrier ribs defining a plurality of display cells on a display region of the display panel for displaying an image and further defining a plurality of light generation cells on a non-display region of the display panel for generating light that is different from the image, the non-display region at least partly surrounding the display region; and a pair of cameras located at or near a periphery of the display panel, aligned with respective diagonal directions of the display panel, and oriented to detect the light generated by the light generation cells to determine a touch position of an object on the display panel, wherein the light is infrared light.

29. The plasma display device of claim 28, further comprising:

a front case and a rear case containing the display panel, wherein the front case has a portion covering the non-display region.

30. The display device according to claim 28, wherein the pair of cameras are located at respective corners of the display panel.

31. The display device according to claim 28, further comprising an infrared light blocking filter on the display region.

32. The display device according to claim 28, further comprising an infrared transmission filter located in front of at least one of the cameras.

* * * * *